US010388059B2

(12) United States Patent
Luebke et al.

(10) Patent No.: US 10,388,059 B2
(45) Date of Patent: Aug. 20, 2019

(54) STABLE RAY TRACING

(71) Applicant: NVIDIA Corporation, Santa Clara, CA (US)

(72) Inventors: David Patrick Luebke, Charlottesville, VA (US); Alessandro Dal Corso, Copenhagen (DK); Marco Salvi, Kirkland, WA (US); Craig Eugene Kolb, Oakland, CA (US); Samuli Matias Laine, Vantaa (FI)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 15/724,139

(22) Filed: Oct. 3, 2017

(65) Prior Publication Data

US 2018/0096516 A1 Apr. 5, 2018

Related U.S. Application Data

(60) Provisional application No. 62/403,628, filed on Oct. 3, 2016.

(51) Int. Cl.
*G06T 15/06* (2011.01)

(52) U.S. Cl.
CPC .......... *G06T 15/06* (2013.01); *G06T 2210/21* (2013.01)

(58) Field of Classification Search
CPC ...................................................... G06T 15/06
See application file for complete search history.

(56) References Cited

U.S. PATENT DOCUMENTS 6,111,582 A 8/2000 Jenkins
7,839,404 B2 11/2010 Bordoloi et al.
(Continued)

FOREIGN PATENT DOCUMENTS

EP 1908017 A2 4/2008

OTHER PUBLICATIONS

Akenine-Moller, Thomas and Eric Haines. "Real-time rendering." 2nd ed. (2002), pp. 81-84 and 92-101. (Year: 2002).*
(Continued)

*Primary Examiner* — Daniel F Hajnik
(74) *Attorney, Agent, or Firm* — Zilka-Kotab, PC

(57) ABSTRACT

A method, computer readable medium, and system are disclosed for performing stable ray tracing. The method includes the steps of identifying a plurality of old hit points used in a previously rendered frame, re-projecting the plurality of old hit points within a current frame to create a plurality of samples within a screen space of the current frame, adjusting the plurality of samples within the screen space of the current frame, based on one or more criteria, for each of the plurality of samples, tracing a ray from the sample toward a corresponding old hit point for the sample to determine a current hit point corresponding to the sample for the current frame, where the current hit point may include the corresponding old hit point for the sample or an updated hit point for the sample, shading at least a portion of the plurality of current hit points to obtain a color for each of the plurality of samples within the screen space of the current frame, and reconstructing a final color for a plurality of pixels in the screen space of the current frame, utilizing the color for each of the plurality of samples within the screen space of the current frame.

18 Claims, 13 Drawing Sheets

(56) References Cited

U.S. PATENT DOCUMENTS

| | | | | |
|---|---|---|---|---|
| 8,174,524 | B1 | 5/2012 | Laur | |
| 9,589,367 | B2 | 3/2017 | Golas et al. | |
| 9,672,654 | B2 | 6/2017 | Shin et al. | |
| 2004/0001645 | A1* | 1/2004 | Snyder | G06T 15/04 382/276 |
| 2013/0077893 | A1* | 3/2013 | Moon | G06T 5/002 382/299 |
| 2015/0084957 | A1 | 3/2015 | Shin et al. | |
| 2015/0091894 | A1 | 4/2015 | Shin et al. | |
| 2015/0287233 | A1 | 10/2015 | Shin et al. | |
| 2016/0163087 | A1 | 6/2016 | Cho et al. | |
| 2016/0314610 | A1 | 10/2016 | Lee et al. | |
| 2017/0263046 | A1 | 9/2017 | Patney et al. | |

OTHER PUBLICATIONS

Dietrich, Andreas, and Philipp Slusallek. "Adaptive spatial sample caching." Interactive Ray Tracing, 2007. RT'07. IEEE Symposium on. IEEE, 2007. (Year: 2007).*

Martin et al. "Temporally coherent interactive ray tracing," Journal of Graphics Tools, vol. 7, No. 2, 2002, pp. 41-48.

Salvi, M., "An Excursion in Temporal Supersampling," GDC16, Mar. 22, 2016, pp. 1-56.

Dayal et al., "Adaptive Frameless Rendering," ACM SIGGRAPH 2005 Courses, 2005, pp. 1-12.

Cook et al., "The Reyes Image Rendering Architecture," Computer Graphics, vol. 21, No. 4, Jul. 1987, pp. 95-102.

Bala et al., "Combining edges and points for interactive high-quality rendering," ACM Transactions on Graphics (TOG), vol. 22, No. 3, 2003, pp. 631-640.

Herzog et al., "Spatio-temporal upsampling on the GPU," Proceedings of the 2010 ACM SIGGRAPH symposium on Interactive 3D Graphics and Games, ACM, 2010, pp. 1-8.

Karis, "High-quality temporal supersampling," In Advances in Real-Time Rendering in Games, Part I, No. 10, ACM SIGGRAPH 2014 Courses, pp. 1-55.

Nehab et al., "Accelerating real-time shading with reverse reprojection caching," Graphics Hardware, vol. 41, 2007, pp. 1-11.

Patney et al., "Towards Foveated Rendering for Gaze-tracked Virtual Reality," ACM Transactions on Graphics, vol. 35, No. 6, Nov. 2016, pp. 179:1-179:12.

Scherzer et al., "Pixel-Correct Shadow Maps with Temporal Reprojection and Shadow Test Confidence," Eurographics Symposium on Rendering, 2007, pp. 1-6.

Velazquez-Armendariz et al. "Implementing the Render Cache and the Edge-and-Point Image on Graphics Hardware," Graphics Interface, 2006, pp. 1-7.

Halter et al., "Interactive Rendering Using the Render Cache, "Rendering techniques '99, Proceedings of EGWR 1999, Springer, 1999, pp. 1-13.

Yang et al., "Amortized supersampling," ACM Transactions on Graphics, Dec. 2009, pp. 1-12.

Zhu et al., "A GPU Accelerated Render Cache," Proceedings of Pacific Graphics, 2005, pp. 1-3.

Chapman et al., "Spatio-Temporal Coherence in Ray Tracing," Graphics interface, 1991, pp. 101-108.

Chen et al., "View Interpolation for Image Synthesis," roceedings of SIGGRAPH 93, ACM, 1993, pp. 279-288.

Gouraud, H., "Continuous Shading of Curved Surfaces," IEEE Transactions on Computers, vol. C-20, No. 6, Jun. 1971, pp. 87-93.

Groller et al., "Using temporal and spatial coherence for accelerating the calculation of animation sequences," Eurographics, 1991, 13 pages.

Havran et al., "An Efficient Spatio-Temporal Architecture for Animation Rendering," Eurographics Symposium on Rendering, 2003, 13 pages.

Jimenez et al., "SMAA: Enhanced Subpixel Morphological Antialiasing," Eurographics, vol. 31, No. 2, Part 1 & 2, 2012, 15 pages.

Mark et al., "Post-Rendering 3D Warping," Symposium on Interactive 3D Graphics, Apr. 27-30, 1997, 11 pages.

Parker et al. "OptiX: A General Purpose Ray Tracing Engine," ACM Transactions on Graphics, vol. 29, No. 4, Article 66, Jul. 2010, pp. 66:1-66:13.

Sitthi-Amorn et al., "An Improved Shading Cache for Modem GPUs," Graphics Hardware, 2008, pp. 1-7.

Sitthi-Amorn et al., "Automated Reprojection-Based Pixel Shader Optimization," ACM Transactions on Graphics, SIGGRAPH, 2008, pp. 1-10.

Tawara et al., "Exploiting Temporal Coherence in Global Illumination," Research Gate, May 2004, 12 pages.

Walter et al., "Enhancing and Optimizing the Render Cache," Thirteenth Eurographics Workshop on Rendering, 2002, pp. 1-6.

Zhou et al., "Variance reduction using interframe coherence for animated scenes," Computational Visual Media, vol. 1, No. 4, Dec. 2015, pp. 343-349.

Adelson et al., "Generating Exact Ray-Traced Animation Frames by Reprojection," IEEE Computer Graphics and Applications, May 1995, pp. 43-52.

Badt, Sid Jr., "Two algorithms for taking advantage of temporal coherence in ray tracing," The Visual Computer, vol. 4, 1988, pp. 123-132.

Iglesias-Guitian et al., "Pixel History Linear Models for Real-Time Temporal Filtering," Pacific Graphics, vol. 35, No. 7, 2016, pp. 363-372.

Murakami et al., "Incremental Ray Tracing," Photorealism in Computer Graphics, 1992, pp. 17-32.

Narvekar et al., "A No-Reference Image Blur Metric Based on the Cumulative Probability of Blur Detection (CPBD)," IEEE Transactions on Image Processing, vol. 20, No. 9, Sep. 2011, pp. 2678-2683.

Bigler et al., "Design for Parallel Interactive Ray Tracing Systems," IEEE Symposium on Interactive Ray Tracing, Sep. 2006, pp. 187-196.

McGuire et al., "The Alchemy Screen-Space Ambient Obscurance Algorithm," Proceedings of ACM SIGGRAPH/Eurographics High-Performance Graphics (HPG'11), 2011, pp. 1-7.

* cited by examiner

STABLE RAY TRACING

CLAIM OF PRIORITY

This application claims the benefit of U.S. Provisional Application No. 62/403,628 titled "STABLE RAY TRACING," filed Oct. 3, 2016, the entire contents of which is incorporated herein by reference.

FIELD OF THE INVENTION

The present invention relates to ray tracing, and more particularly to implementing stable ray tracing during image rendering.

BACKGROUND

A rendered image may contain aliasing artifacts in regions where the underlying signal carries higher frequency content than the local sampling rate can capture. For example, light reflected from a highly specular surface can lead to aliasing if not sampled at a sufficiently high rate. In addition, such aliasing artifacts may be perceived as particularly objectionable if high-frequency details are inconsistently sampled, causing sample values to change rapidly in time. However, current methods for resolving aliasing have temporal stability and blurring issues.

Thus, there is a need for addressing these issues and/or other issues associated with the prior art.

SUMMARY

A method, computer readable medium, and system are disclosed for performing stable ray tracing. The method includes the steps of identifying a plurality of old hit points used in a previously rendered frame, re-projecting the plurality of old hit points within a current frame to create a plurality of samples within a screen space of the current frame, adjusting the plurality of samples within the screen space of the current frame, based on one or more criteria, for each of the plurality of samples, tracing a ray from the sample toward a corresponding old hit point for the sample to determine a current hit point corresponding to the sample for the current frame, where the current hit point may include the corresponding old hit point for the sample or an updated hit point for the sample, shading at least a portion of the plurality of current hit points to obtain a color for each of the plurality of samples within the screen space of the current frame, and reconstructing a final color for a plurality of pixels in the screen space of the current frame, utilizing the color for each of the plurality of samples within the screen space of the current frame.

DETAILED DESCRIPTION

Figure 1:
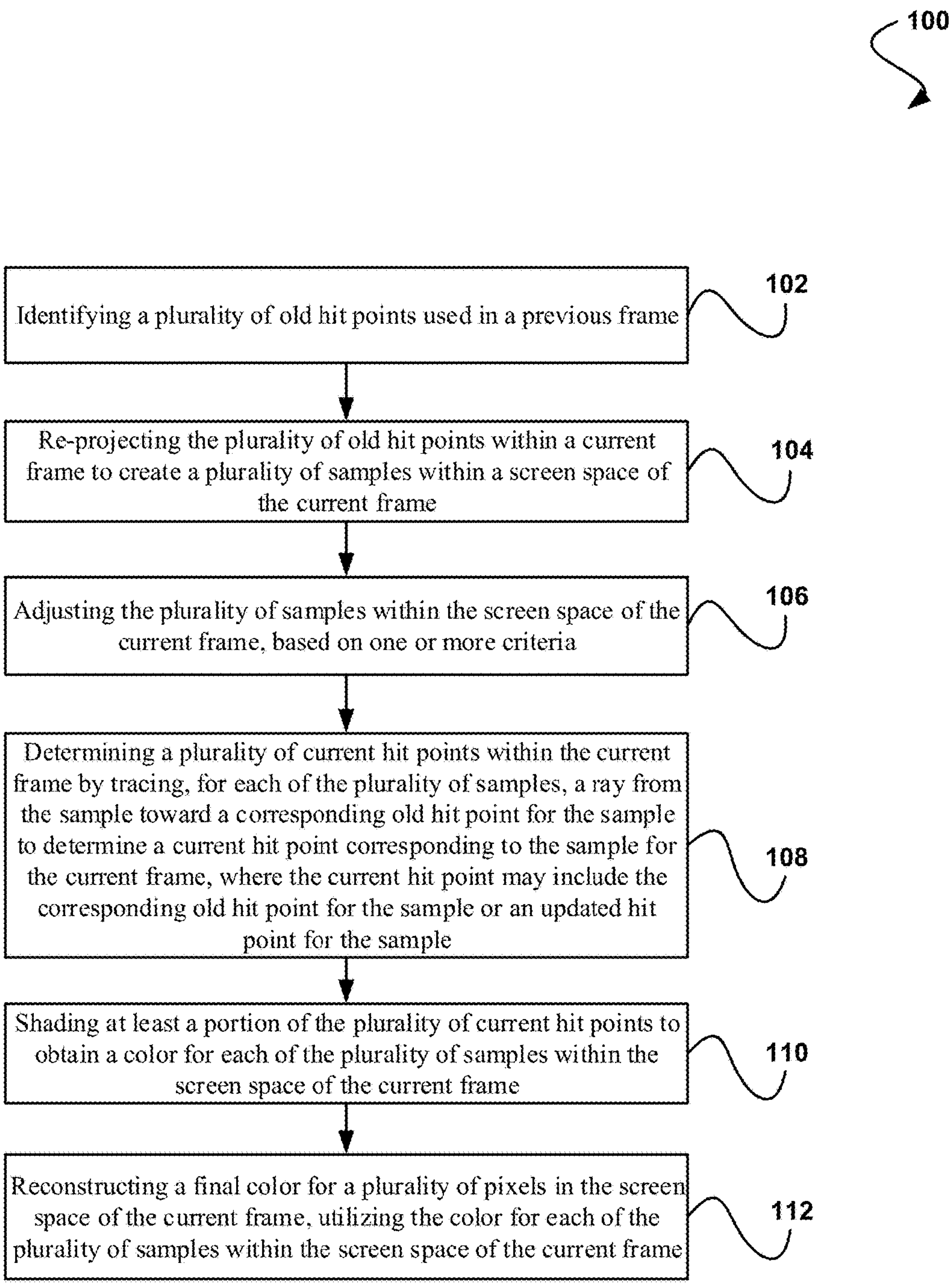
FIG. 1 illustrates a flowchart of a method for performing stable ray tracing, in accordance with one embodiment.

FIG. 1 illustrates a flowchart of a method 100 for performing stable ray tracing, in accordance with one embodiment. As shown in operation 102, a plurality of old hit points used in a previously rendered frame are identified. In one embodiment, the hit points may represent points in a world space (e.g., a modeled world/scene being rendered) during the previously rendered frame. In another embodiment, a ray extending from each of the old hit points in the world space may intersect a screen space in the previously rendered frame. Of course, however, the plurality of old hit points may represent points in any graphical space.

Additionally, as shown in operation 104, the plurality of old hit points are re-projected within a current frame to create a plurality of samples within a screen space of the current frame. In one embodiment, the plurality of hit points in the world space may be re-projected onto the screen space during the current frame. In another embodiment, camera and/or object motion may be accounted for during the re-projecting. For example, if one or more rays from the plurality of hit points falls outside of a view of the screen space (e.g., a view frustum including a field of view of a camera, etc.), the one or more hit points may be discarded.

In one embodiment, the current frame may include an image to be rendered. In another embodiment, the current frame may include one of a predetermined plurality of frames to be rendered. For example, the current frame may be included within a predetermined plurality of video frames to be rendered for display or further analysis. In another embodiment, each of the plurality of frames may be ordered in a predetermined sequence.

Further, in one embodiment, the re-projecting may include computing, for each of the plurality of hit points, a location of a sample within a screen space, where the sample indicates an intersection at the screen space of a ray intersecting the hit point. In another embodiment, the screen space may include a representation of data displayed on a display screen. For example, the screen space may include a plurality of pixels of the display screen.

Further still, in one embodiment, the screen space may be represented by a screen space data structure. For example, each pixel of the screen space may be represented by a pixel stored within the screen space data structure. In another example, the screen space data structure may store 3D spatial samples. For instance, samples located within the screen space may be stored within the screen space data structure. In yet another example, stored samples may be linked to their associated hit point.

Also, in one embodiment, for each of one or more single pixels of the screen space data structure, two or more samples may be stored within the single pixel. For example, multiple rays associated with different hit points may intersect the screen space at the same sample location. In another example, multiple different samples, each associated with a unique hit point, may be stored within a single pixel in the screen space data structure.

In addition, in one embodiment, the re-projecting may be performed in shade space. For example, a triangle identifier and barycentric coordinates may be tracked for each hit point. In another example, during re-projection, a hit point position may be found by looking at new locations of a hit point's triangle vertices, and interpolating using barycentric coordinates.

In addition, as shown in operation 106, the plurality of samples are adjusted within the screen space of the current frame, based on one or more criteria. In one embodiment, the plurality of samples may be adjusted in order to create a desired sample distribution (e.g., a stratified and low discrepancy sample distribution, etc.). In another embodiment, the adjusting may include removing one or more of the plurality of samples from a pixel within the screen space (e.g., when a pixel within the screen space contains a number of samples greater than a threshold, when the pixel and one or more neighboring pixels contain a total number of samples greater than the threshold, etc.). In yet another embodiment, the adjusting may include adding one or more additional samples to a pixel within the screen space (e.g., when a pixel within the screen space contains a number of samples less than a threshold).

Further still, in one embodiment, the adjusting may include dividing each pixel within the screen space data structure into a plurality of subpixels. A target range of samples per pixel may then be computed (e.g., by examining one or more previously rendered frames, etc.). This may include estimating a local measure of image frequency (e.g., contrast, variance, etc.) across the image, using information from the previously rendered frame. This estimate may be used to set a per-pixel target sampling rate range. For example, low-contrast pixels may receive fewer samples in the associated range when compared to high-contrast pixels.

Also, in one embodiment, the adjusting may include determining, for each pixel within the screen space data structure, a number of samples stored within that pixel, and comparing the number of samples to the target range. Upon determining that the pixel contains a number of samples greater than the target range of samples, a subpixel may be identified within the pixel that has the greatest number of samples when compared to all subpixels within the pixel, and a random sample may be discarded from the subpixel. The identification and discarding may be repeated until the pixel contains a number of samples within the target range. Of course, however, any method of achieving the desired sample distribution may be implemented.

Additionally, in one embodiment, upon determining that the pixel contains a number of samples less than the target range, a subpixel may be identified within the pixel that has the fewest number of samples when compared to all subpixels within the pixel. A new sample may be generated and added to the subpixel. New samples may not have an associated hit point. The identification and adding may be repeated until the pixel contains a number of samples within the target range of samples. In another embodiment, the generation of new samples may be prioritized.

Further, as shown in operation 108, a plurality of current hit points are determined within the current frame by tracing, for each of the plurality of samples, a ray from the sample toward a corresponding old hit point for the sample to determine a current hit point corresponding to the sample for the current frame, where the current hit point includes the corresponding old hit point for the sample or an updated hit point for the sample.

Further still, as shown in operation 110, at least a portion of the plurality of current hit points are shaded to obtain a color for each of the plurality of samples within the screen space of the current frame. In one embodiment, the shading may include identifying all rays traced through samples associated with re-projected hit points, and determining whether the ray intersects the same re-projected hit point, or intersects an occluding object.

Also, in one embodiment, the shading may include re-using one or more of previous shading computation values and previous shading results for one or more of the plurality of current hit points. For example, the shading may include determining whether a ray traced through a sample intersects the same hit point as the associated old hit point for the sample. If so, a new shading calculation may be performed, or some or all of a previous shading calculation made for the old hit point (e.g., a computation component or final color from an earlier shading calculation) may be re-used for the current hit point. In another example, previous shading results may include color, a shading computation component (specular highlights, diffuse color), etc.

In addition, the adjusting may include determining whether an old hit point is occluded in the current frame. For example, if the old hit point is occluded in the current frame, it may be removed from a cache of hit points. In another example, if the old hit point is occluded in the current frame, the old hit point maybe kept in the cache (and may be re-projected in subsequent frames) until it is occluded for a predetermined number of frames. This may improve temporal stability for surfaces occluded by thin geometry (i.e. background geometry occluded by a foreground fence, etc.).

Furthermore, in one embodiment, for each of the plurality of hit points, the shading may result in a color for that hit point. For example, the color may be assigned to the sample in the screen space that is associated with the hit point. In another embodiment, selective temporal anti-aliasing may be implemented during the shading. For example, sample motion vectors may be used to determine a local variance in object motion (this may indicate a likely silhouette edge). In another example, a per-pixel temporal blending factor $\alpha$ may be computed using smaller values around silhouette edges, and larger values in other regions where motion is uniform. Temporal anti-aliasing may then be applied using the per-pixel temporal blending factor $\alpha$.

Further still, as shown in operation 112, a final color for a plurality of pixels in the screen space of the current frame is reconstructed, utilizing the color for each of the plurality of samples within the screen space of the current frame. For example, the reconstruction may include, for each pixel, identifying the color of each of the plurality of samples stored within that pixel, and reconstructing the final color for the pixel based on the color of each of the plurality of samples, as well as the location of each of the plurality of samples (e.g., the subpixel location of each of the plurality of samples within the pixel).

In one embodiment, a spatial filter may be applied that measures a sample's color contribution based on a distance of the sample from a center of the pixel. In another embodiment, the final color for a pixel may be determined utilizing a filter that is larger than a single pixel. For example, a reconstruction filter (e.g., a 3×3 Gaussian filter, etc.) may be applied to a plurality of pixels to determine a final color for each of the plurality of pixels.

Also, in one embodiment, the final color may be reconstructed for a portion of the screen space (e.g., a screen space tile) instead of each pixel within the screen space. For example, the screen space tile may include a plurality of pixels, and multiple hit points may be allowed for each tile. In another example, a spatial filter may be applied which may vary a hit point's contribution to a pixel based on its distance to the pixel center. The spatial filter may span neighboring tiles, may assign a color to pixels with no hit points, etc.

Further, in one embodiment, a rendering of the current frame may be continued, utilizing the final color for the plurality of pixels in the screen space of the current frame. Additionally, in another embodiment, stable ray tracing may be applied to secondary rays (e.g., shadow rays, etc.). For example, one or more secondary rays may be identified. It may be determined whether each of the one or more secondary rays has a possible associated change in occlusion. For each of the one or more secondary rays, the ray may be traced, or previous tracing results may be reused for the ray, based at least in part on the determining.

Further, in one embodiment, stable ray tracing may be applied to variable resolution rendering. For example, more rays per pixel may be created in a foveal region, or by reusing prior hit point shades in a peripheral region. In another embodiment, stable ray tracing may be applied to adaptive rendering.

Further still, in one embodiment, stable ray tracing may be applied to automotive-based rendering. For example, training simulations may rely on rendered imagery, and stable ray tracing may result in increased real-world accuracy of such rendered imagery.

Also, in one embodiment, stable ray tracing may be applied to one or more deep learning applications. For example, stable ray tracing may increase an accuracy/efficiency of image analysis and image recognition. In another embodiment, stable ray tracing may be applied to virtual reality rendering. For example, stable ray tracing may be applied to irregular sampling (e.g., foveated rendering), low-latency rendering, etc.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
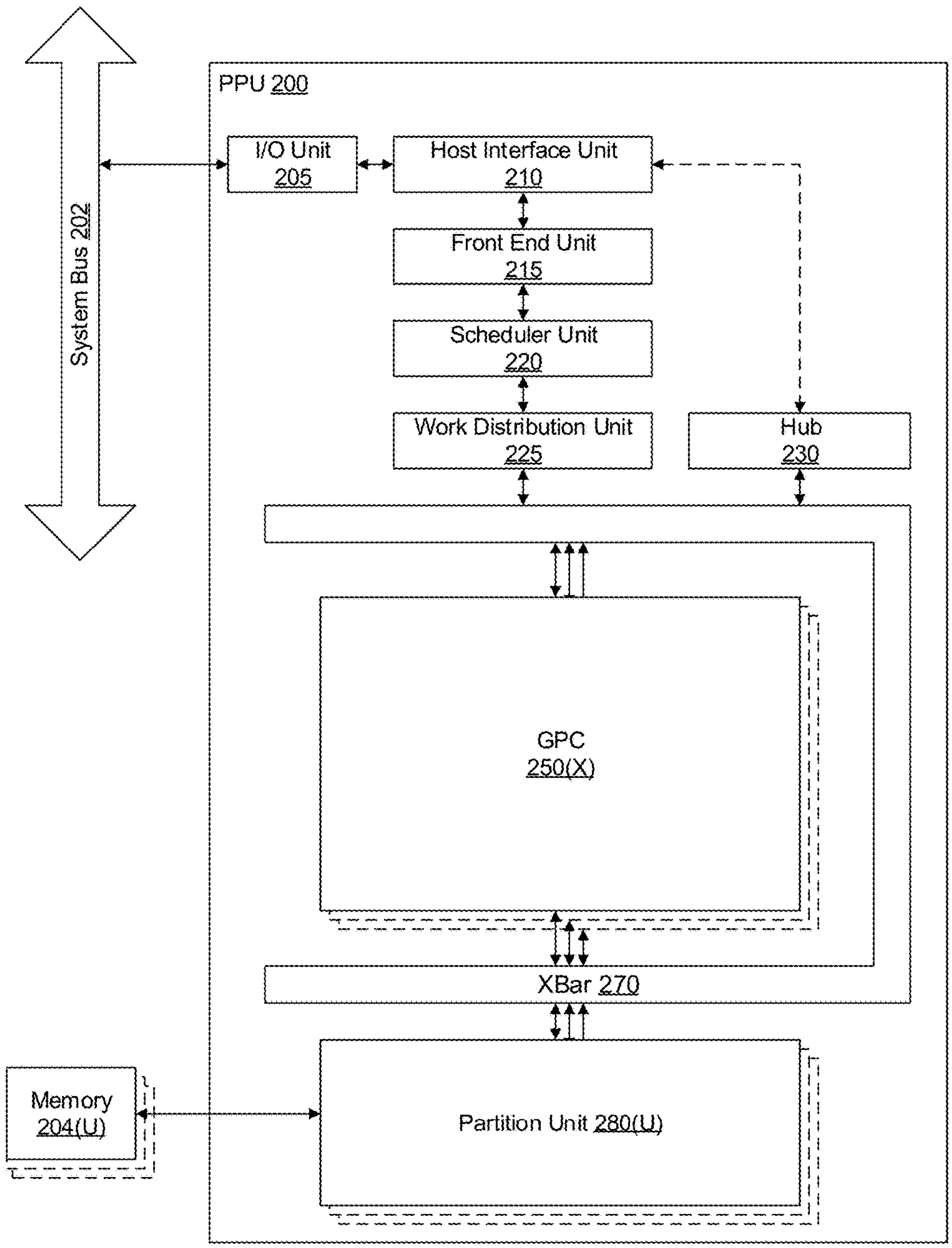
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
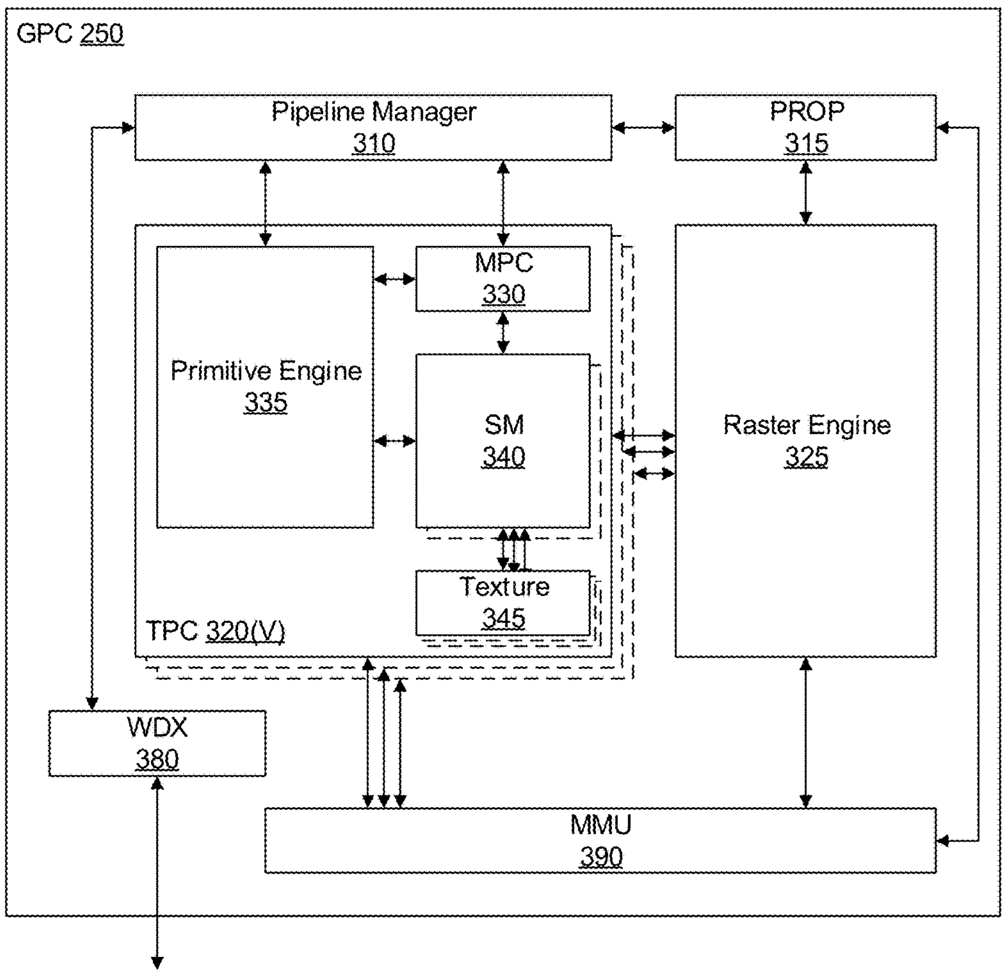
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
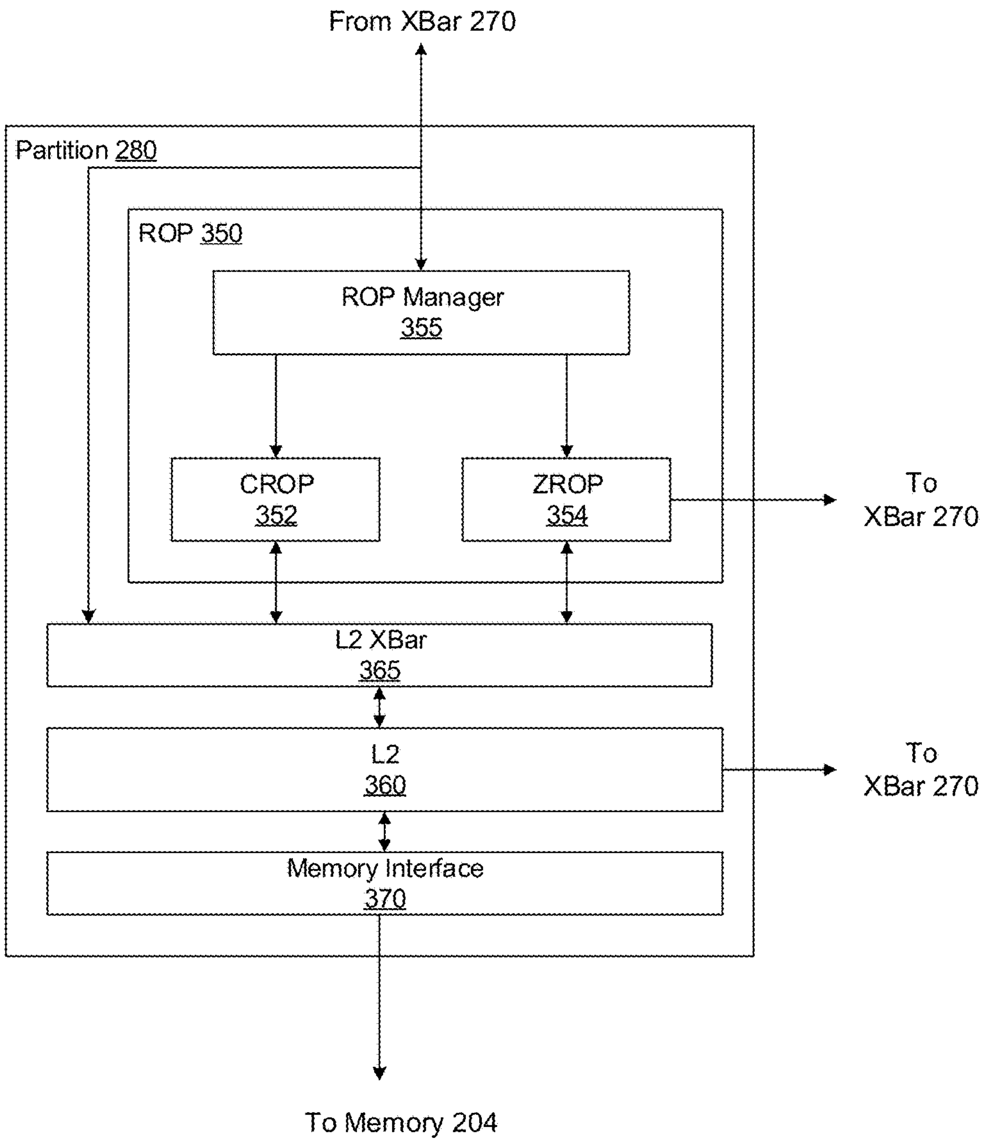
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
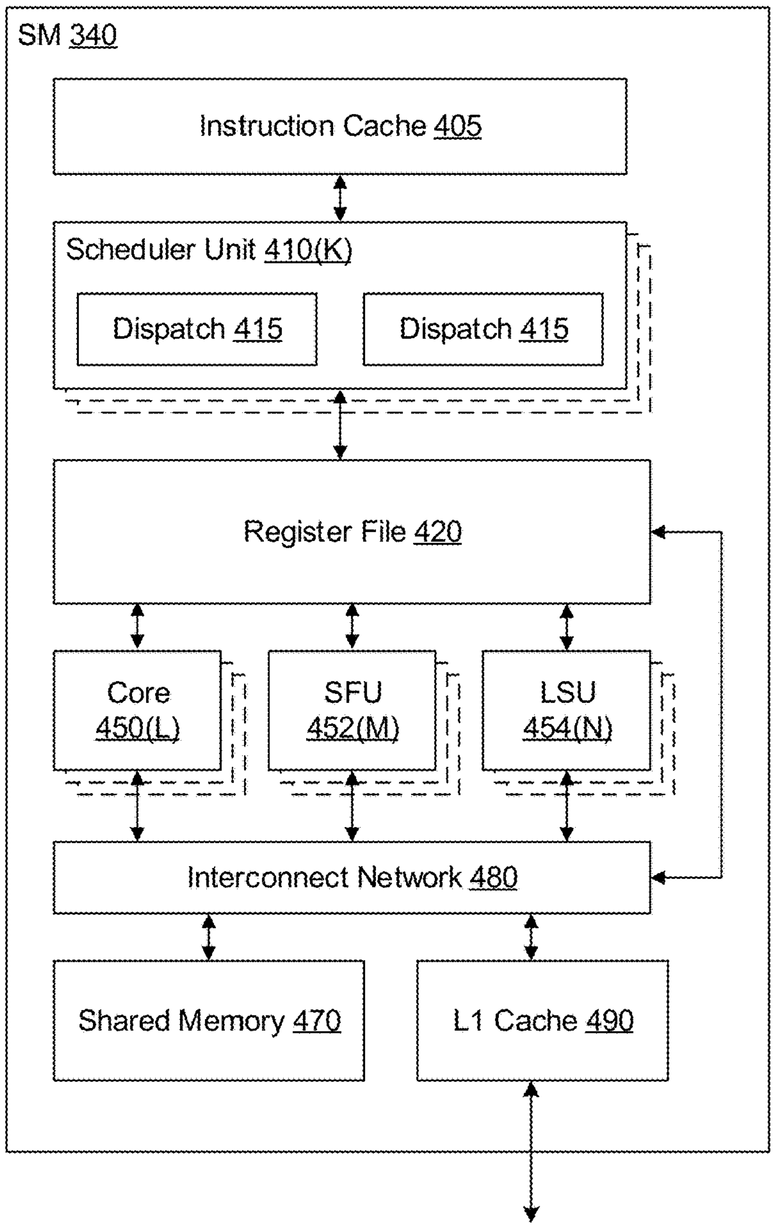
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
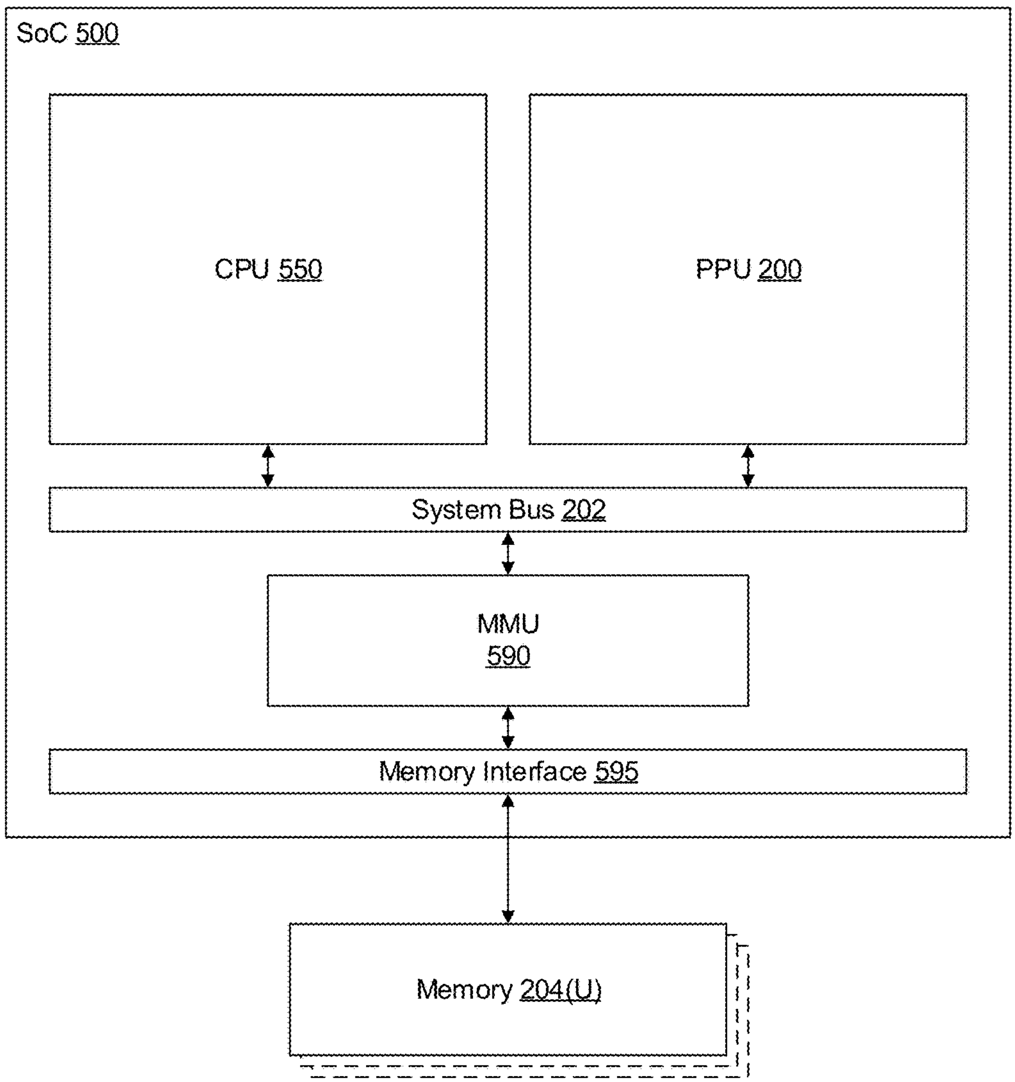
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
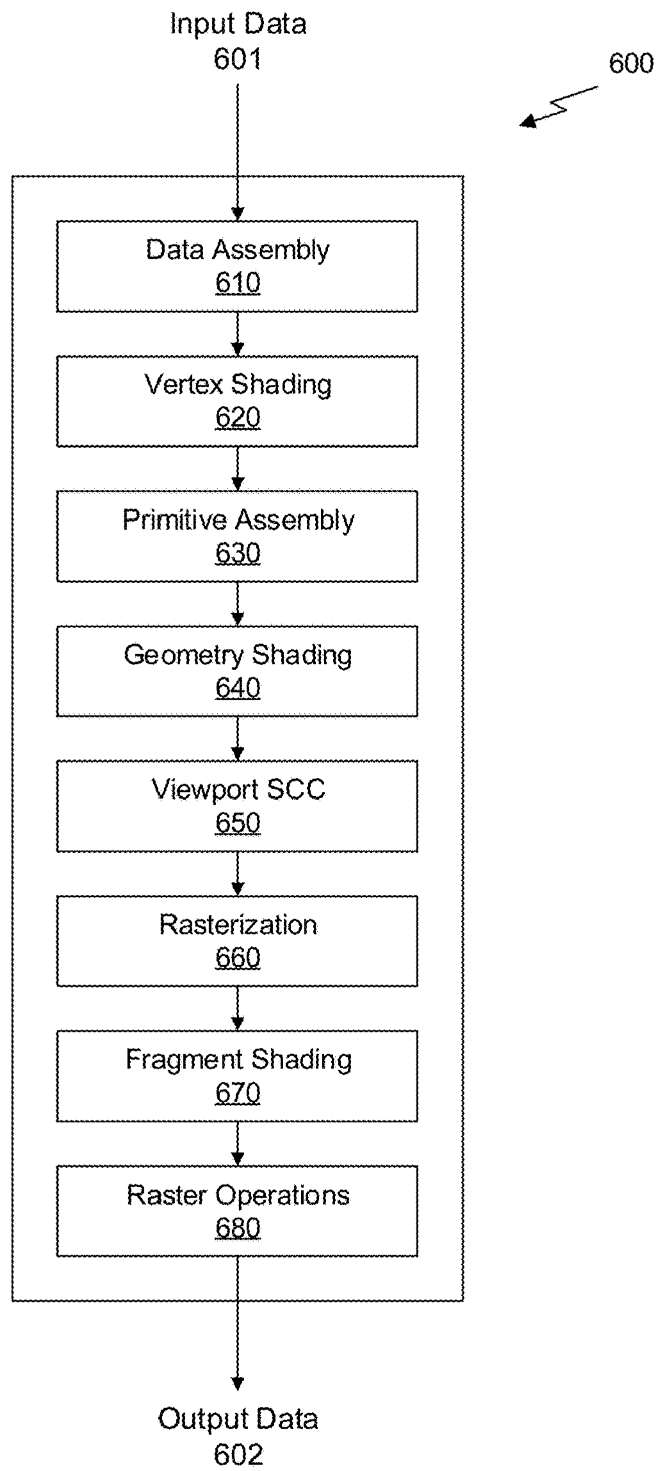
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Figure 7:
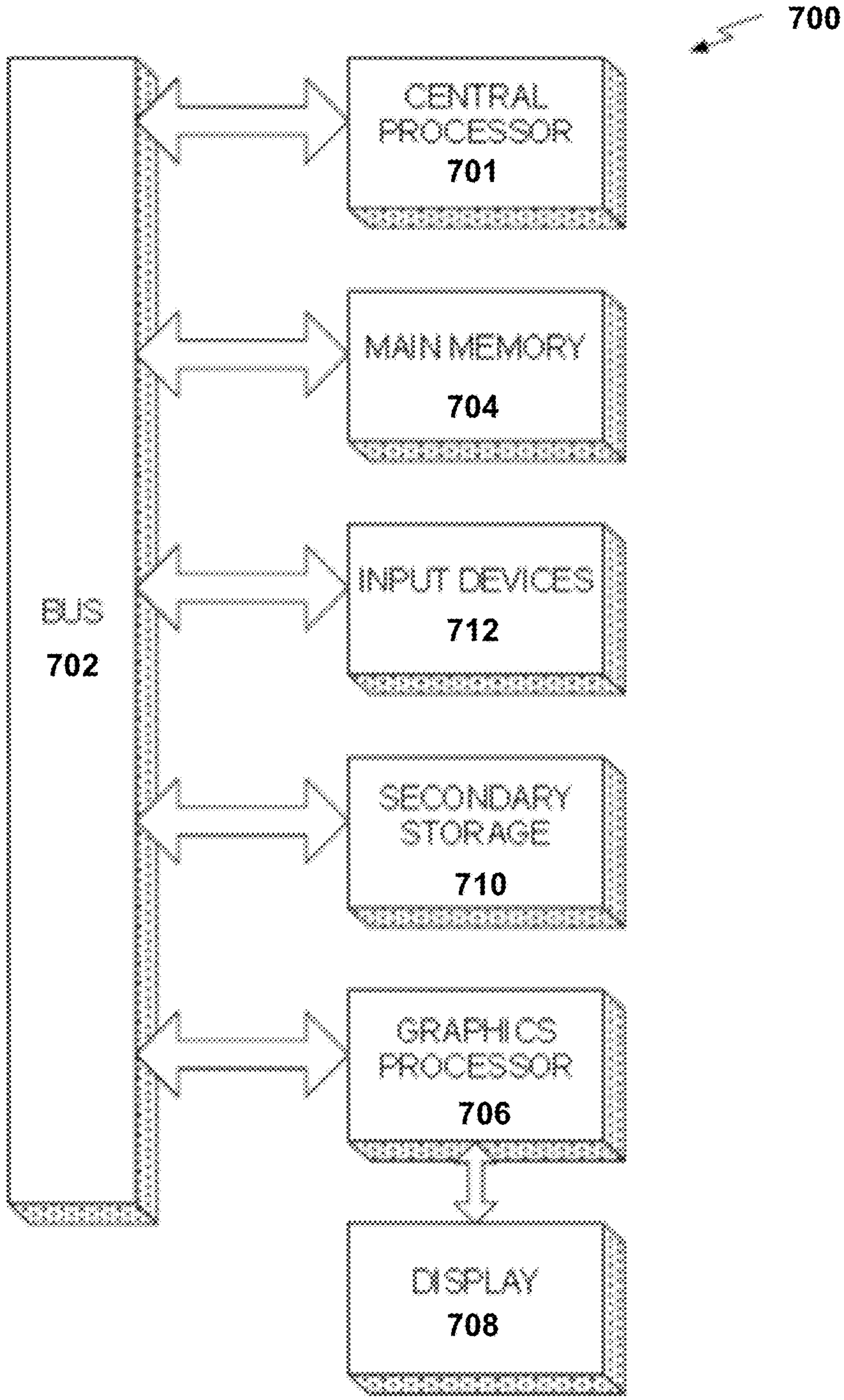
FIG. 7 illustrates an exemplary system in which the various architecture and/or functionality of all embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

Stable Ray Tracing

Stable ray tracing may re-use shade locations from previous frames. Each frame, the hit points used in previous frames may be re-projected into the current frame (forward re-projection), accounting for camera and object motion. Rays that miss all geometry may optionally be considered as hitting an infinitely distant "sky" for this purpose. If the hit point falls outside of the view frustum, it may be discarded. Otherwise, the screen space sample location may be computed for the hit point, and the hit point may be associated with the screen space sample location.

In one embodiment, multiple samples may be explicitly tracked and incorporated per pixel. The pixel may first be divided into a fixed number of subpixels, and then a target range of samples may be computed per pixel by, for example, examining the local contrast in the previous frame. Following re-projection of previous hit points into the current frame, the number of samples may be considered in each pixel. Some pixels may contain too many samples compared to the target, in which case a random sample may be repeatedly discarded from the most-occupied subpixel until the pixel sample count falls within range. On the other hand, some pixels may have fewer samples than targeted, in which case a new sample may be iteratively generated in the least-occupied subpixel until the pixel sample count is within range. Unlike reused samples, these new samples may not have an associated hit point.

Once the set of sample locations has been determined for the entire frame, a ray may be traced through each sample location to determine a new set of hit points. For samples corresponding to a re-projected hit point, the new hit point may be identical (i.e., the hit point will be on the same location of the same object), in which case the old hit point may be shaded anew (using the new view direction), or some or all of the result of the hit point's previous shading calculation may be re-used. This re-use of shading locations and/or values may allow the algorithm to achieve temporal stability.

Figure 8:
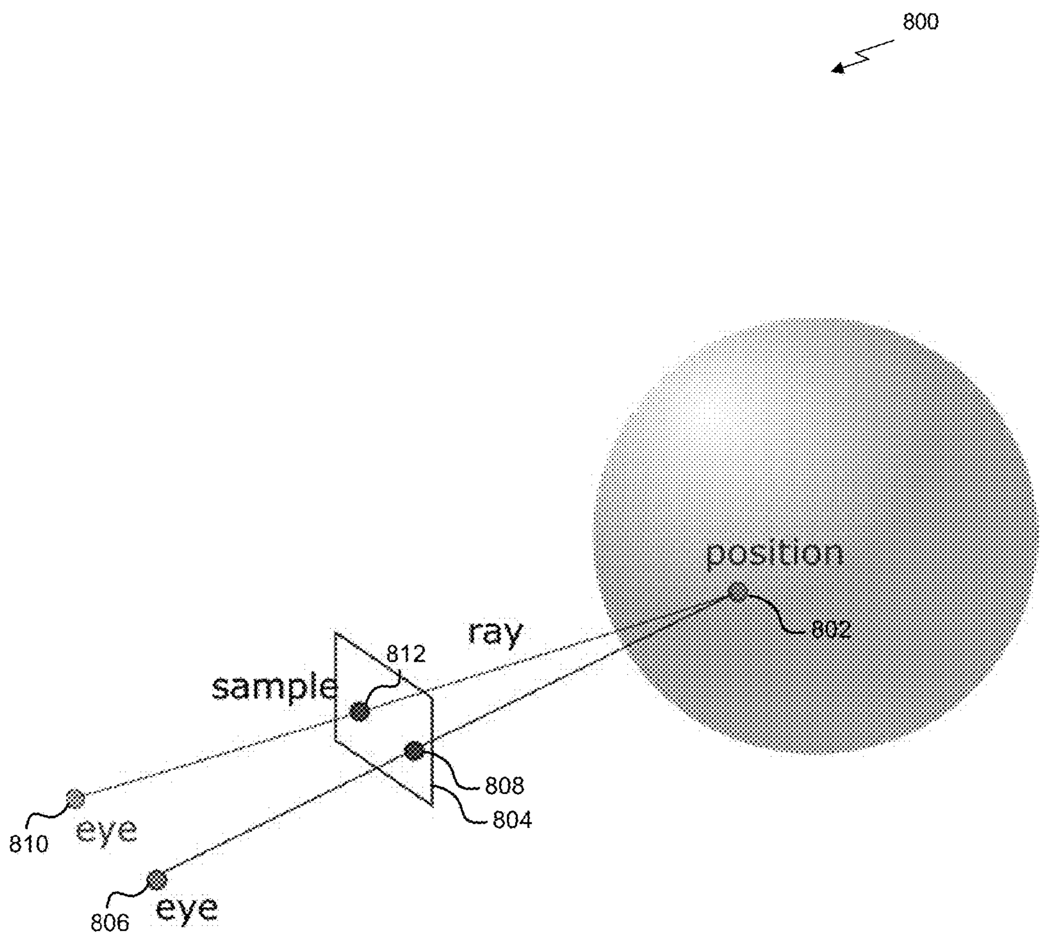
FIG. 8 illustrates an exemplary re-projection of a hit point within a current frame to a second camera/eye location to create a second sample, in accordance with one embodiment.

FIG. 8 illustrates an exemplary re-projection 800 of a hit point 802 within a current frame 804 to a second camera/eye location 806 to create a second sample 808. For example, during a previous frame, a first camera/eye location 810 would have resulted in a first sample 812 within the current frame 804. However, during the current frame 804, movement of the camera/eye to the second location 806 results in a second sample 808 within the current frame 804.

Table 1 illustrates an exemplary re-projection calculation of a new screen space location p from a world space location $x_{world}$, in accordance with one embodiment. Of course, it should be noted that the calculation shown in Table 1 is set forth for illustrative purposes only, and thus should not be construed as limiting in any manner.

TABLE 1

$$x^{clip} = P \cdot x^{world}$$

$$p = \frac{x^{clip}_{xy}}{x^{clip}_{w}} \cdot \frac{(w, h)}{2} + \frac{(w, h)}{2}$$

In one embodiment, once the new set of hit points have been generated, they may be shaded; either from scratch or by optionally re-using previous shade results for that hit point (e.g., by applying heuristics to determine reuse as in temporal AA). Once shaded hit points are gathered, they may become 2D image samples, a filtered reconstruction may be performed, which may simultaneously compute motion vectors for the last stage. Finally, selective temporal filtering may be used to further improve image quality, and produce the final image.

Figure 9:
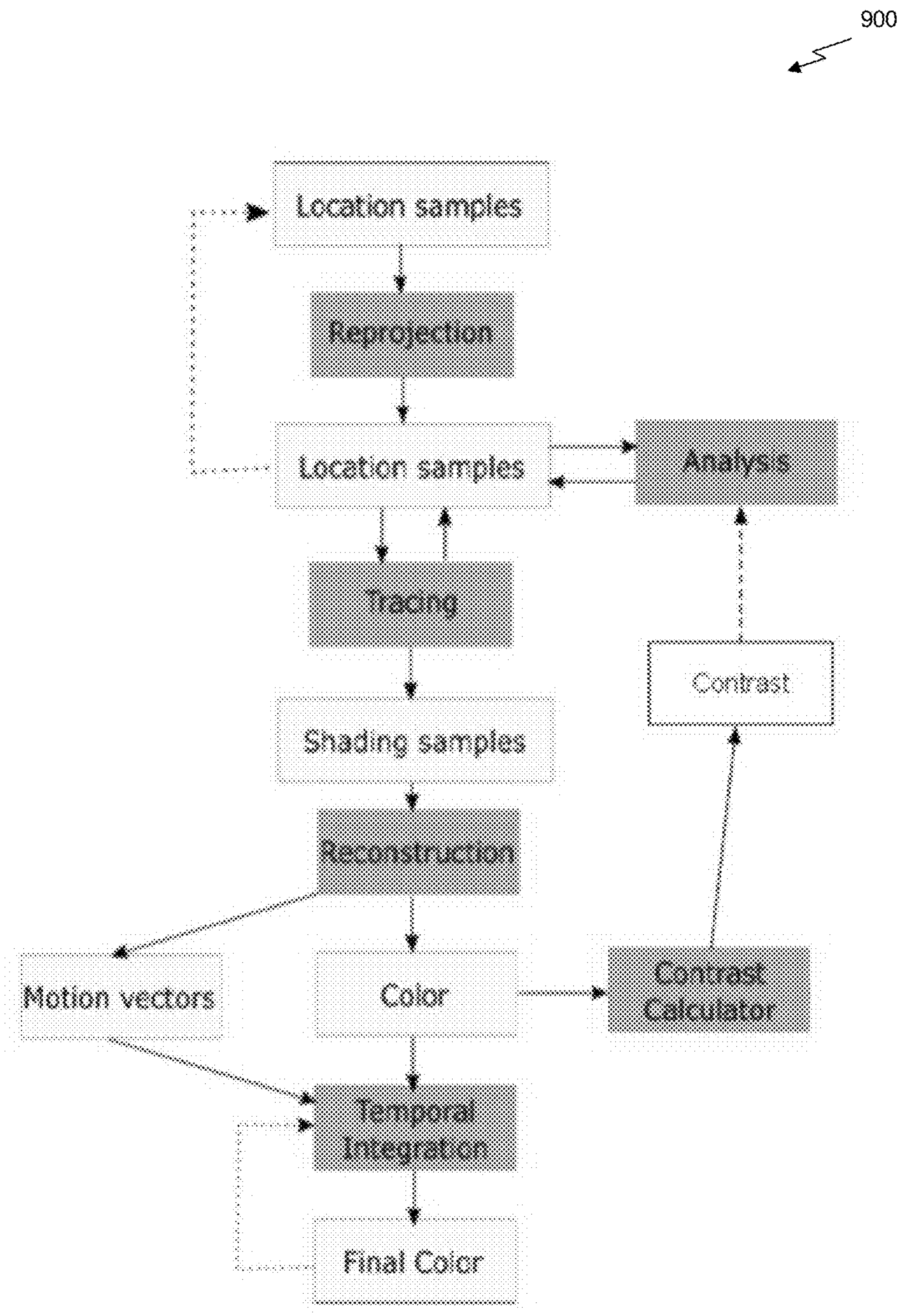
FIG. 9 illustrates an exemplary stable ray tracing data flow, in accordance with one embodiment.

FIG. 9 illustrates an exemplary stable ray tracing data flow 900, in accordance with one exemplary embodiment. Other variations allow for applying similar techniques to secondary rays, with the ability to optimize ray tracing queries, are described below.

Re-Projecting Shade Space Points

Stable ray tracing may re-project world space points in order to reuse samples. However, the finite floating-point precision of the re-projection and ray cast may lead to finding a slightly different hit point, potentially even on a different triangle. In very aliasing-prone situations, such as a bumpy specular surface, this may lead to sparkling. Second, although accounting for camera motion during re-projection is simple, accounting for dynamic may be more complex. Temporal AA techniques may rely on per-sample or per-pixel velocity vectors, but such vectors may be imprecise (e.g., movement of points on a spinning tire cannot be predicted by a simple vector).

In one embodiment, re-projection may be performed in shade space, for example by tracking the triangle ID and barycentric coordinates of each hit point. During re-projection of dynamic objects, the hit point position may be found by looking up the new locations of the hit point's triangle vertices (which may be computed already to generate the new acceleration structure this frame) and interpolating using the barycentric coordinates. This may incur extra memory traffic to look up the vertices, but cache locality may be efficient if nearby hit points are computed at the same time (for example using a space-filling curve). The same technique may be used for re-projection of static geometry.

Generalizing Samples Per Pixel

In one embodiment, multiple samples per pixel, or less than one sample per pixel, may be tracked. For example, following re-projection, a varying number of active hit points are allowed to be associated with each pixel. However, after re-projection, some pixels may contain very few or no hit points, while others may contain a larger number.

A lack of samples in a screen space region may occur for a number of reasons, including: (1) camera motion bringing new parts of the scene into view at the screen edges, (2) disocclusion of regions at silhouette edges due to camera or object movement, or (3) samples "spreading" (becoming less dense in screen space) as a surface moves closer to the camera. For such pixels, it may be ensured that a minimum number of new hit points are generated by prioritizing the creation of new samples in them.

Other regions may contain dense sets of re-projected hit points; for example, an individual pixel may end up with many samples. This may occur when an object moves away from the camera, which may cause hit points on that object to cluster in screen space.

Sample Analysis

Although a varying number of samples may be used per pixel, the total number of rays traced may be controlled in order to maintain consistent performance. As such, more samples may be taken where the image is under sampled, and samples may be removed (e.g., marked for retirement, etc.) in regions that are oversampled.

In order to determine the desired number of samples per pixel, a local measure of image frequency may be estimated across the image (for example, local contrast, variance, or other statistics), using information from the previously-rendered frame. This estimate may then be used to set a per-pixel target sampling rate range, with, for example, low-contrast pixels receiving fewer samples than high-contrast pixels. Using a range rather than a single value may allow the elimination of high-temporal-frequency changes in the number of samples per pixel, which may lead to visible artifacts.

Once target sampling rates have been determined, each pixel may be analyzed to ensure that the number of samples in the pixel falls within its target. To do so, each pixel may be divided into a number of substrata (e.g., 1, or 4, or . . . ) in order to ensure an even distribution of samples across each pixel. If the pixel contains too many samples, one random hit point may be incrementally marked for retirement in the substratum containing the most samples, until the total number left in the pixel is within the target range. If the pixel contains too few samples, a new sample may be incrementally added to the substratum containing the fewest until the total number in the pixel is within range.

Table 2 illustrates an exemplary adjustment of samples per pixel (SPP), in accordance with one embodiment. Of course, it should be noted that the adjustment shown in Table 2 is set forth for illustrative purposes only, and thus should not be construed as limiting in any manner.

TABLE 2

| |
|---|
| We define $N_{min}$ and $N_{max}$ spp |
| Given N spp: |
| If $N < N_{min}$ : Add samples |
| If $N_{min} < N < N_{max}$ : Do nothing |
| If $N > N_{max}$: Remove samples |

Tracing Rays

Screen space visibility may be determined by tracing a nearest-hit ray for every new or re-projected sample on the screen. For samples associated with re-projected hit points, it may be determined whether the corresponding ray intersects the same hit point, or if it instead intersects an occluding object.

If the same point on the same object is hit, the point may be shaded again using the new view vector, or all/some of the results may be reused from the previous time the hit point was shaded.

If a re-used hit point is occluded, one option may be to simply remove it from the cache of hit points. Another option may be to keep it in the cache and remove it only after it has been occluded for a given number of frames. Keeping such occluded hit points cached may be beneficial when high-frequency temporal changes in visibility occur, such as translating past a thin picket fence such that hit points behind the fence cycle between being visible and occluded. Re-using hit points in these situations may help further reduce flickering and noise, which may improve overall stability, at the cost of tracking additional hit points and tracing additional rays.

Temporal Filtering

At low sampling rates, low-frequency noise introduced by re-projection-induced sample motion may be more objectionable than the aliasing that occurs with fixed but 'noise-free' screen space sampling patterns. This may be particularly true near silhouette edges. In order to mitigate these effects without incurring a large performance penalty, temporal anti-aliasing (AA) may be a useful tool. However, uniform application of temporal AA across the image may lead to significant loss of detail due to blurring and ghosting. Instead, sample motion vectors may be used to determine where there is local variance in object motion, indicating a likely silhouette edge. A per-pixel temporal blending factor, a, may then be computed using smaller values around silhouette edges (decreasing noise at the cost of loss of detail), and larger values in regions where motion is uniform (preserving detail). Temporal AA may then be applied using the per-pixel a. This process may allow the application of temporal AA only where it is needed.

Reconstruction

Less than one sample per pixel may be supported by generalizing the notion of a 'pixel' to 'screen space tile' and reconstructing from the resulting nonuniform set of samples.

To do so, multiple hit points may be allowed per tile of pixels, and image generation may be treated as sparse reconstruction from irregular samples: a spatial filter may be applied in which a shaded hit point's contribution to a pixel varies with its distance to the pixel center. By allowing the spatial filter to span neighboring tiles, a color may be assigned to pixels with no hit points (based on the samples in nearby pixels), which may make the algorithm more robust in situations with low ray budgets.

Shading Reuse

In one embodiment, it may be assumed that re-projected hit points will be re-shaded every frame. In addition, all or part of the shading calculation may optionally be reused. Instead of re-shading a hit point, the application may store the final color and simply reuse that color when generating the final image. Alternatively, some slowly-varying or view-independent component of the final shading computation may be remembered and reused. This re-use may eliminate some or all of the shading computation for those hit points, at the risk of reduced quality. For example, shading of highly specular materials may not be reused, since the resulting specular highlights may not appear to move smoothly and correctly across the surface as the camera or object moves. This decision may be made dynamically, using heuristics such as those used in temporal AA when deciding whether to blend in samples from a previous frame.

Secondary Rays

In one embodiment, stable ray tracing may be applied to secondary rays in order to stabilize, for example, soft shadows. In particular, secondary rays with origins on static objects and static associated hit points may be used to optimize the tracing of secondary rays.

As an example, consider shadow rays. If both the point being shaded and the light source are static, a previously-unoccluded shadow ray may become occluded due to a dynamic object. As such, such rays may be intersected against a bounding volume hierarchy (BVH) that omits static objects, and may use simplified geometry/bounding volumes for the dynamic objects, which may provide a fast conservative answer for unoccluded rays. If the verification ray intersects the lower-resolution dynamic proxies, a verification ray may be traced against the full-resolution dynamic objects.

Similarly, if the point being shaded and the light source are static, a previously-occluded shadow ray may not become unoccluded if the occluder is static. In such cases there may be no need to trace a verification ray. In this way, such shadow rays may be traced once and may be reused as long as the point being shaded is visible from the eye.

Variable Resolution

Systems such as foveated renderers, which track the user's gaze and direct more samples to the high-resolution fovea than to the low-resolution periphery, may rely on the ability to vary a sample rate across the screen. Stable ray tracing may offer a natural framework for variable-resolution rendering, for example by shooting more rays/pixel in the foveal region or by more aggressively reusing prior hit point shades in the peripheral region. Compared to screen-space foveated rendering schemes, the use of stable shade locations may greatly reduce flicker in the low-resolution peripheral regions (which may be very distracting; the peripheral retinal field is no less sensitive to temporal change than the fovea).

Adaptive Rendering

Because stable ray tracing may increase or decrease the number of hit points tracked with fine granularity, a location where new rays are shot may be prioritized, as well as which hit points compute shading anew versus reusing prior shades. In this way, stable ray tracing may be used for adaptive "best effort" algorithms that give a progressively better image as more time is allocated, while degrading gracefully as time runs short.

Benefits

In this way, stable ray tracing may support multiple samples per pixel. This may provide higher quality initial AA, reduce scintillation caused by disappearing hit points, and reuse more hit points (since a hit point is not necessarily eliminated the moment it lands in a pixel with another hit point). Additionally, stable ray tracing may handle less than one hit point/sample per pixel. This may allow intentional subsampling in ray- or shading-limited situations, and may be robust to unintentional subsampling when ray budgets do not quite suffice to shoot every pixel.

Additionally, hit points may be faded out over multiple frames. This may reduce scintillation when hit points are retired. Occluded hit points may also be kept in a cache for several frames, for later re-use if it again becomes visible, which may further increase stability. Further, in addition to hit points, shading results, may be re-used. This may apply not only to final shading results but to intermediate results such as slowly-varying or view-independent components of the final shaded color.

Further still, different strategies may be applied to prioritize rays to pixels which have too few hit points, such as prioritizing pixels disoccluded by screen or silhouette edges over pixels where hit points on a surface have simply spread out. Also, shade space re-projection may enable robust re-projection of dynamic or deforming objects, and may overcome possible precision issues in world-space re-projection. In addition, selective temporal AA may be applied, which may improve the appearance of silhouette edges without sacrificing detail elsewhere in the image.

In addition, stable ray tracing may use forward re-projection, which may evaluate precisely the same shade points in the current frame as in the previous frame. This may reduce blur and ghosting when compared to temporal AA, which must look up interpolated points from the previous frame. Stable ray tracing may also correctly handle complex dynamic objects whose surface motion is not well represented by per-pixel velocity vectors.

Furthermore, stable ray tracing may reuse a shading computation for many frames. Temporal AA algorithms may perform a weighted blend of prior frame results into the current frame, so the contribution of a given shading computation will decrease exponentially over time. In stable ray tracing, a hit point that stays on screen may conceivably contribute to hundreds of frames.

Further still, utilizing stable ray tracing, it may be adaptively decided whether to re-use a given shade or compute it afresh. This is an improvement on temporal AA, which may always perform one shade per pixel and decide whether to blend it with the previously computed shade from prior frames.

Interactive Stable Ray Tracing

Figure 10:
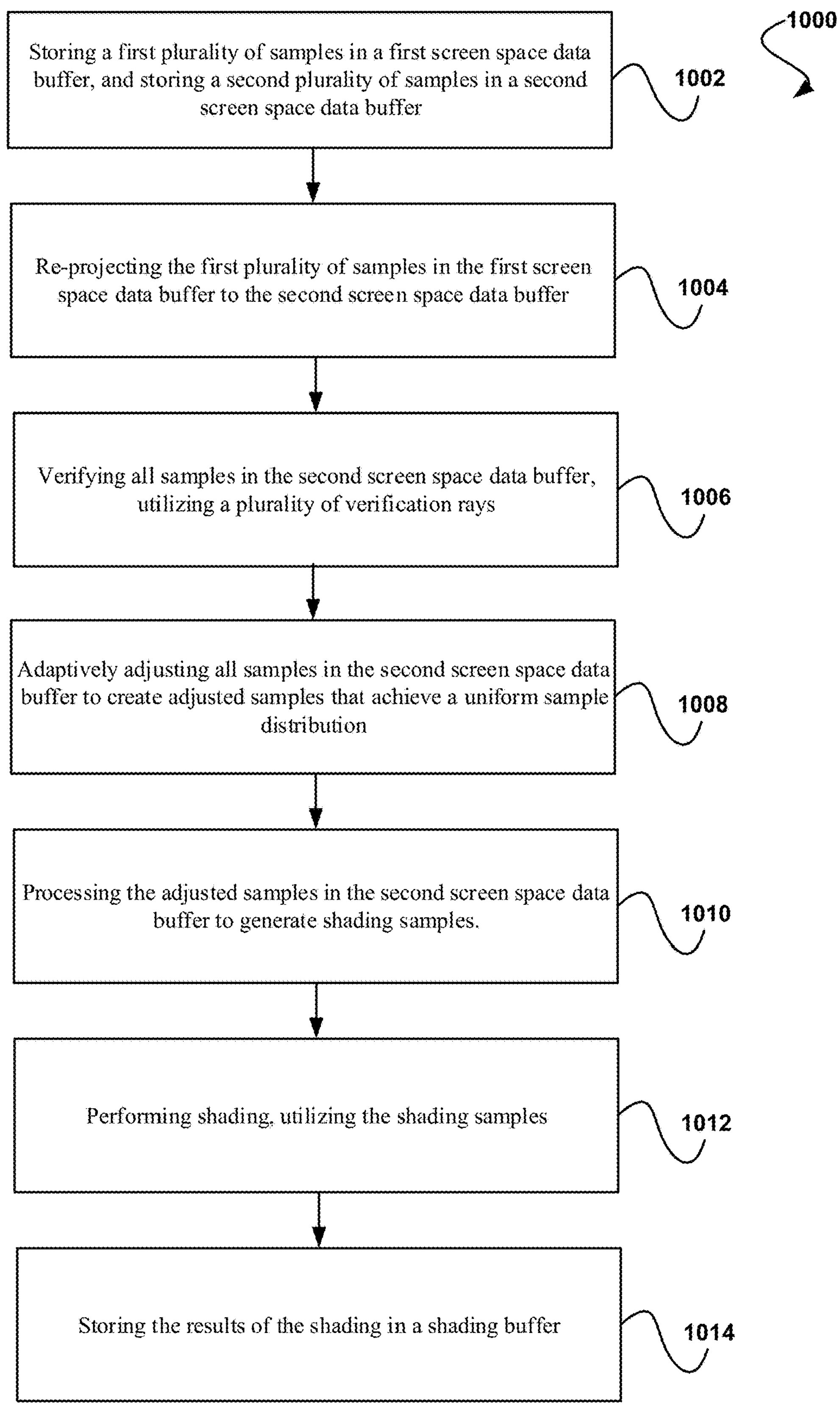
FIG. 10 illustrates a flowchart of a method for performing interactive stable ray tracing, in accordance with one embodiment.

FIG. 10 illustrates a flowchart of a method 1000 for performing interactive stable ray tracing, in accordance with one embodiment. As shown in operation 1002, a first plurality of samples are stored in a first screen space data buffer, and a second plurality of samples are stored in a second screen space data buffer. In one embodiment, the first buffer is associated with a previous frame, and the second buffer is associated with a current frame.

Additionally, as shown in operation 1004, the first plurality of samples in the first screen space data buffer are re-projected to the second screen space data buffer. Further, as shown in operation 1006, all samples in the second screen space data buffer are verified, utilizing a plurality of verification rays.

Further, as shown in operation 1008, all samples in the second screen space data buffer are adaptively adjusted to create adjusted samples that achieve a uniform sample distribution. Further still, as shown in operation 1010, the adjusted samples in the second screen space data buffer are processed to generate shading samples.

Also, as shown in operation 1012, shading is performed, utilizing the shading samples. In addition, as shown in operation 1014, the results of the shading are stored in a shading buffer.

A rendered image may contain aliasing artifacts in regions where the underlying signal carries higher frequency content than the local sampling rate can capture. For example, light reflected from a highly specular surface may lead to aliasing if not sampled at sufficiently high rate. In addition, such aliasing artifacts may be perceived as particularly objectionable if high-frequency details are inconsistently sampled, causing sample values to change rapidly in time.

Stable shading may successfully mitigate aliasing artifacts in practice. In stable shading, shading calculations may be performed in an object-local parametrization space, such as at the vertices of an underlying mesh, and the resulting values may be interpolated across image pixels. These same object-local vertices may be shaded again in subsequent frames, improving temporal stability in the presence of aliasing. However, these stable shading techniques may not work well with approaches such as ray tracing, wherein shading locations are determined independently of and without regard to any underlying local surface parametrization.

Stable ray tracing may improve upon previous stable shading approaches to improve the visual quality and/or reduce the computational cost of generating a sequence of images using ray tracing. Rather than using independent rays to sample the screen, shading locations from previous frames may be re-used when possible. The fact that the points being shaded are temporally coherent may result in fewer objectionable artifacts, even though the resulting images are still aliased. Furthermore, intermediate shading values may be cached along with the shading location, providing an additional performance benefit.

In one embodiment, stable ray tracing may be based on sample re-projection. Some challenges in re-projection are verifying visibility of re-projected samples and avoiding large holes in the resulting screen space sampling pattern. The first issue may be addressed by tracing visibility rays from the camera to the re-projected samples. For the second issue, new samples may be generated on demand, where the demand is determined using screen space sample density estimation. This density estimation may be performed efficiently using a super-resolution bitmask that maps subpixel sample locations. This bitmask is also useful for removing samples to keep a uniform sample distribution. As an example application of stable ray tracing, amortized sampling may be used to add progressively path traced indirect illumination to an image. Stable ray tracing may significantly improve temporal stability as compared with supersampling and as compared with an existing re-projection techniques. In addition, an image sharpness metric may be used to verify that stable ray tracing avoids the blur of post-process filtering techniques.

Overview

Figure 11:
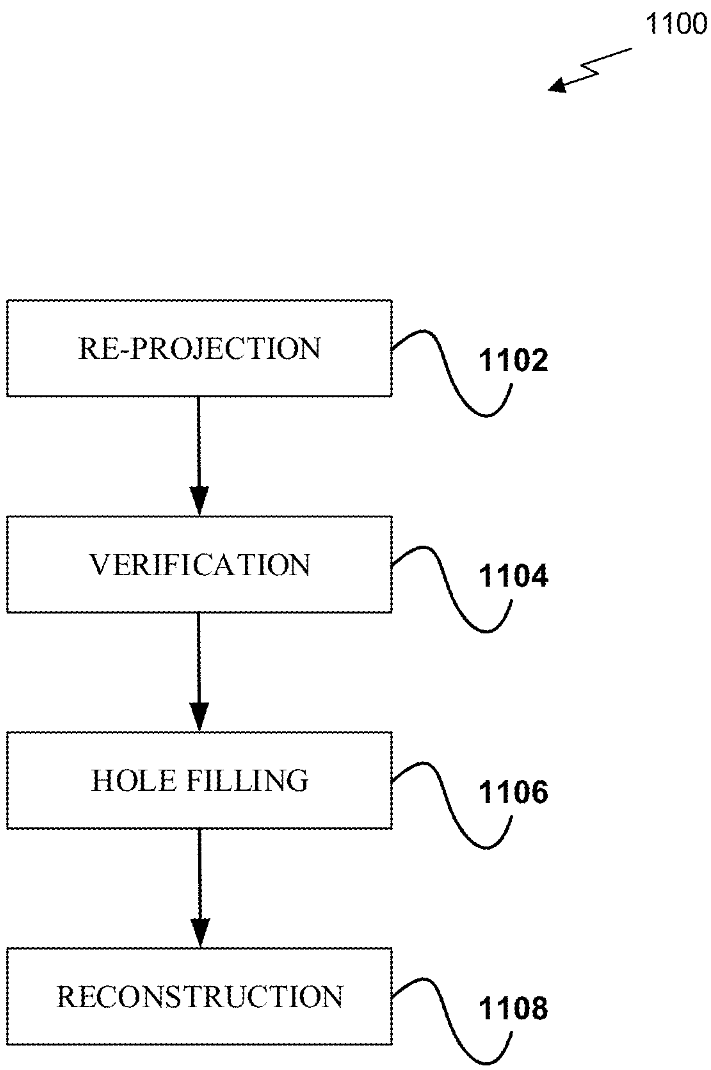
FIG. 11 illustrates an exemplary stable ray tracing implementation, in accordance with one embodiment.

FIG. 11 illustrates an exemplary stable ray tracing implementation 1100 that includes four phases 1102-1108. As shown, the re-projection phase 1102 projects cached shading locations from the previous frame into screen space of the current frame, accounting for camera and object motion/deformation, to create a set of screen space sample locations. The verification phase 1104 constructs and traces primary visibility rays through the screen space sample locations to determine which of the re-projected shading positions are visible from the camera. Visible locations are then shaded, optionally caching intermediate results of the shading computation for later reuse. The hole filling phase 1106 generates screen space samples in regions where the density of visible re-projected points is low, and traces, shades, and caches hit point/shading information. Finally, the reconstruction phase 1108 generates the final image for the current frame from the set of shaded samples.

The above implementation may improve temporal stability through the reuse of shading points across frames. Additional adjustments may be made to optimize interactive performance.

Sampling Rate and Uniformity

Sampling rate is one means of trading image quality for performance. Unlike conventional ray tracing, wherein screen sample locations are essentially independent of objects in the scene, in stable ray tracing screen space sampling density may be highly non-uniform due to the effects of camera and object movement on re-projected samples. Re-projection may lead to oversampling due to many points being re-projected to the same region of the screen, for example when an object moves away from the camera, or the camera zooms out. In such cases, maintaining performance may involve ensuring that oversampling is kept to a minimum. Conversely, re-projection may also lead to undersampling due to disocclusions, or when sample density decreases due to a surface moving closer to the camera. In such cases, maintaining image quality may involve ensuring that enough samples are used. Highly non-uniform sampling may also lead to issues with resource contention (for example, multiple threads attempting to write to same cache location during re-projection) and load balancing. In addition, nonuniform sampling may produce artifacts when the sampling rate is very low compared to the reconstruction rate.

In order to ensure appropriate sampling rate and uniformity, an analysis phase may be added prior to verification. The analysis phase may efficiently estimate local sampling density and may add or remove samples to ensure the sampling rate falls within a specified range. The analysis phase may make use of a bitmask that encodes a quantized representation of the sampling pattern in each pixel, which may allow for an estimation of sampling density without having to read or recompute exact screen space locations for each sample.

Caching

A sample cache may allow temporal re-use of shading locations and intermediate values. However, stable ray tracing's computational and memory overhead is proportional to the number of entries that are re-projected and potentially verified and shaded. As such, a cache eviction policy may be used that allows trading performance and memory use for temporal stability.

One policy may be to evict points that are occluded or otherwise not used in the current frame. However, stability in the face of high-frequency visibility changes may be improved if occluded points remain in cache long enough to be re-used when they become visible again. As a result, there may be a tradeoff between the space and re-projection cost of keeping occluded points in the cache and the temporal stability improvements to which such points may contribute in the future.

In addition to storing in the cache sufficient information to reconstruct world space position, the cache may also be used to avoid recomputation of expensive intermediate values required during shading (e.g., visibility or normals). Taken together, these values may cause each cache entry to be rather large. As such, minimizing overall size may increase performance, as is minimizing cache reads due to memory bandwidth constraints.

A two-phase cache eviction scheme may be used that strives to strike a balance between overall performance and temporal stability. The first set of evictions may occur in the re-projection phase and the second set of evictions may occur in the analysis phase.

Ray Tracing

One exemplary stable ray tracing algorithm may have two distinct ray tracing phases: verification and hole filling. The number of holes to be filled may be small compared to the number of verification rays, and as a result the overhead associated with launching a separate hole-filling ray tracing pass may be non-trivial. As such, performance may benefit if it were possible to combine the two ray tracing passes into one.

In one exemplary implementation, verification-failure holes may be filled by using the occluding hit points discovered in the verification phase. This optimization may improve performance over the naive implementation, at the cost of some sampling bias and an increase in sampling rate variance. However, the instability added may be typically spatially incoherent and may persist for a single frame, and as such may not be objectionable.

Method

In one embodiment, samples may be stored in two screen space data buffers, which serve as caches for the previous and current frame. At the beginning of each frame, samples may be re-projected from the previous buffer to the current to account for object and camera motion. The outcome of the re-projection process may be analyzed and samples in the re-projection buffer may be adaptively added or removed in order to achieve a uniform sample distribution. The location samples may then be verified, and may finally be shaded. The resulting color information may be stored in a shading buffer, which may be used by the reconstruction phase to resolve color.

Re-Projection

Stable ray tracing may require that cached samples are updated to reflect scene dynamics such as camera motion and object motion and deformation. The data to be stored per sample in the re-projection buffers may thus be chosen according to the scene dynamics that one would like to support. A 3D position may be stored in object space coordinates and a transform ID to support affine transformations.

More data may be required to support arbitrary object deformation. The ID that is stored may be used to access an object-to-world transformation matrix for the current frame. This matrix may be in turn used to transform the sample position to world space. The world space position may then be projected onto the screen using the current camera transformation, and samples that fall outside the screen area may be clipped away.

During re-projection, steps may be taken to ensure that not too many samples re-project to the same screen location in order to reduce resource contention, improve load balancing, and manage size of the cache. In one embodiment, samples that are visible over those that are occluded may be kept.

Figure 12:
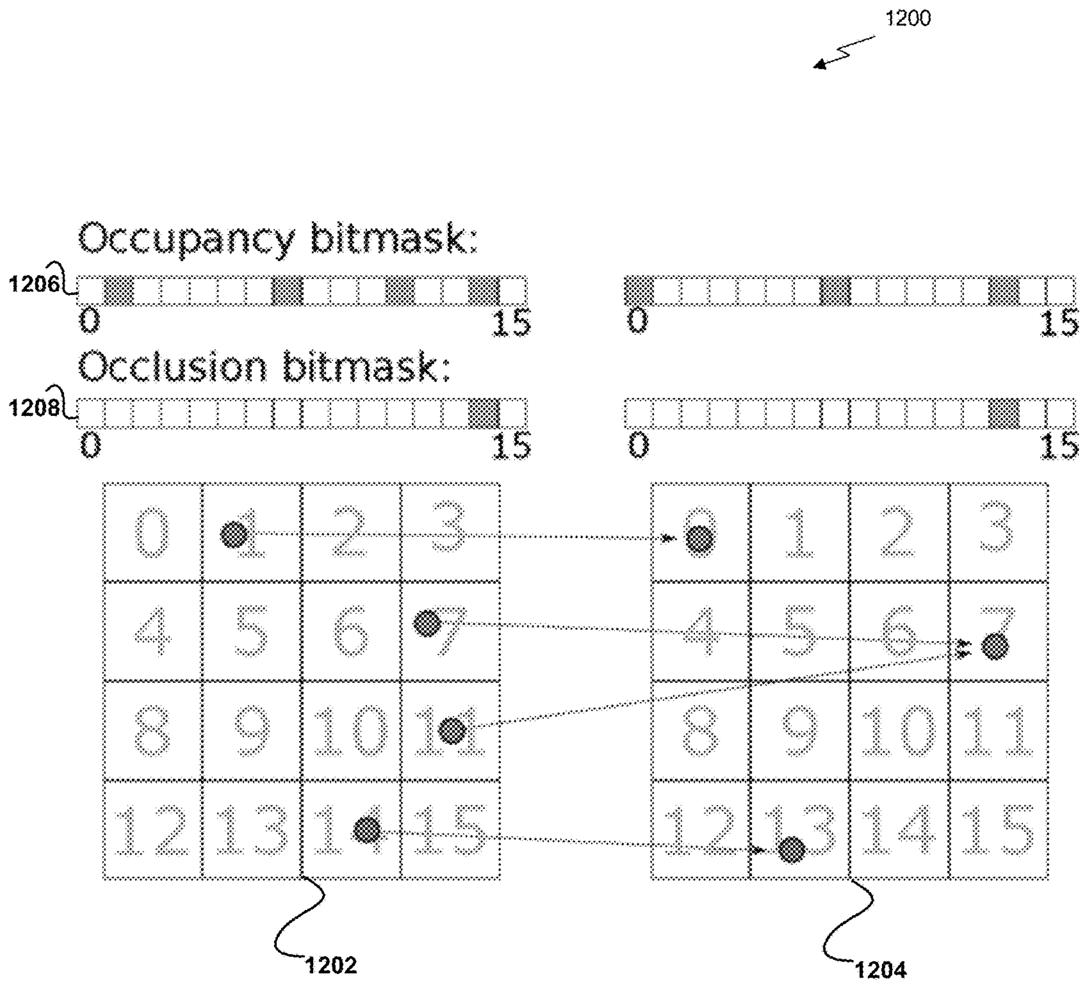
FIG. 12 illustrates exemplary subpixels and associated bitmasks during a reprojection phase, in accordance with one embodiment.

To do so, each pixel in the re-projection buffer may be divided into M×M subpixels. See for example, FIG. 12, which illustrates exemplary subpixels 1202 and 1204 and associated bitmasks 1206 and 1208 during a reprojection phase 1200, according to one embodiment. We may maintain a corresponding occupancy bitmask 1206 representing the occupancy state of each subpixel, which may be cleared at the start of each frame. The occupancy bitmasks 1206 may also be used during the analysis phase to determine an approximate sample location and local sample density. We may similarly maintain with each pixel an M×M bitmask 1208 that indicates if the sample in each subpixel is occluded; values in this occlusion bitmask may be written during the verification phase. Storing these bitmasks separately from the cache values themselves may allow us to reduce bandwidth required by the re-projection phase.

When a source sample re-projects into a given destination subpixel, we may check the destination subpixel's corresponding occupancy bit in the bitmask 1206. If the destination subpixel occupancy bit is zero, the sample may be written to the destination location, the destination occupancy bit may be set to one, and the destination subpixel occlusion bit may be copied from the source bitmask. If the destination subpixel occupancy bit is one, we may examine the destination subpixel occlusion bit. If the destination subpixel occlusion bit is one and the source occlusion bit is zero, the source sample may not be written to the destination, and the destination occlusion bit may be set to zero. Otherwise the source sample may not be written to the destination buffer, which may effectively evict it from the cache.

Table 3 illustrates exemplary eviction scheme pseudocode, in accordance with one embodiment. Of course, it should be noted that the pseudocode shown in Table 3 is set forth for illustrative purposes only, and thus should not be construed as limiting in any manner.

TABLE 3

```
input   : pixelDestination and subpixelDestination for a sample
          and associated data that isOccluded or not.
subpixel ← flatten (subpixelDestination);
bitOccupancy ← 1 << subpixel;
bitOcclusion ← 1 << (subpixel + M·M);
bitMask ← bitOccupancy∨ (isOccluded? bitOcclusion: 0);
originalBitmask ← AtomicOr (pixelDestination, bitMask);
originalIsOccluded ← (bitOcclusion∧ originalBitmask) ==
  bitOcclusion;
replace ← not isOccluded∧ originalIsOccluded;
if not (isOccluded∧ originalIsOccluded) then
  |  AtomicAnd (pixelDestination,¬ bitOcclusion)
end
originalExists ← (bitOccupancy∧ originalBitmask) ==
  bitOccupancy;
if replace∨ not originalExists then
  |  writeData( pixelDestination,data);
end
```

Data races due to competing threads working on the same sample may be avoided by atomically updating the per-sample data, which may potentially cause a performance impact. We may note instead that as we only perform atomic updates of the bitmasks a data race may only occur when a first occluded sample lands on a sample and second unoccluded one tries to overwrite it. In this rare case, we may store the occluded sample over the unoccluded.

Our sample rejection policy may ensure that we cache at most M×M samples in any pixel, enforcing an upper bound on storage and subsequent processing costs, while maintaining a good screen-space distribution of samples, unlike, for example, simply keeping the first M×M samples that re-project into a given pixel would. The mechanism may also ensure that unoccluded samples are preferentially cached over occluded samples.

Sample Analysis

In regions that are oversampled, analysis may choose which samples to remove, and may add new samples in undersampled regions to meet the desired sampling rate.

To help ensure a good spatial distribution of samples, we may divide each pixel in a number of strata (e.g., 4, etc.). For each stratum, we may count the number of samples. To remove samples, we may choose from the substratum with the most number of samples, selecting randomly in the case of a tie. Similarly, we may progressively add samples to the substratum with the fewest samples. This process may allow us to stratify the samples across the pixel. Within a substratum, new samples may be placed in the center, with a small random offset in order to avoid correlation in the screen space location of the samples.

To minimize the overall performance impact of analysis, we may use the occupancy and occlusion bitmasks to determine whether samples should be added or removed. To determine how many to add or remove, we may analyze the local sample density d=NIA, where N is the number of unoccluded samples in an area of A=2×2 pixels around the current pixel. The user may then specify two parameters, $d_{target}$ and $d_{tolerance}$. The algorithm may not add or remove samples if the density is within $[d_{target}-d_{tolerance}, d_{target}+d_{tolerance}]$. Otherwise, we may add or remove enough unoccluded samples ΔN to bring the density within limits:

$$\Delta N = \begin{cases} \text{sgn}(d_{target} - d)\lceil |d_{target} - d| \rceil & \text{if } |d_{target} - d| \geq d_{tolerance} \\ 0 & \text{otherwise,} \end{cases}$$

where the sign of ΔN may tell us whether we need to add or remove samples.

It may be necessary to modify the cache when we add a new sample, since in the next phase we may need to distinguish between new and cached samples. To remove a sample, we may simply set the corresponding occupancy bit to zero. For a new sample, we may write (NaN; $p^x$; $p^y$) instead of its object space position. The NaN marks the sample as new. Since we have to store the new sample in memory, we may also store the chosen screen space coordinates for the sample ($p^x$; $p^y$).

Verification and Shading

The verification phase processes the location samples to generate shading samples for the reconstruction phase. Our algorithm may work on top of any ray tracing framework that provides programmable camera and closest hit stages. We may define a standard ray as a tuple $r=(o,\vec{d},t_{min}, t_{max})$, where the quantities represent origin, direction, and minimum and maximum intersection distances, respectively.

In this step, we may distinguish between cached samples and newly generated samples with screen space coordinates (NaN; $p^x$; $p^y$) in the cache. We may trace these new samples with a closest hit ray, using the stored screen space position to generate a corresponding world space direction $\vec{d}$ according to our camera model. Given the camera position c, our ray becomes $r=(c,\vec{d},\varepsilon,+\infty)$. Once the ray tracing operation terminates, we may store the hit point object space position and transform ID in the re-projection cache, and the corresponding shade in the shading cache.

For existing samples with cached position $x_{object}$, we may first compute its corresponding world space position $x_{world}$. Then, we may cast a closest hit ray $r_{cached}=(c,(x_{world}-c)/\|x_{world}-c\|, \varepsilon, \|x_{world}-c\|+\varepsilon)$. When we hit the closest surface, we may verify that the sample is still visible in the current frame. If the sample is still visible, the intersected t should match the cached $t=\|x_{world}-C\|$.

Occluded samples may cause numerical instability in the shading distribution, in particular around geometric edges. In our implementation, we may mark such samples as occluded and keep them in the cache. However, if an occluded sample is the last one remaining in a pixel, we may replace its hit point with the one from the occluding surface. This allows us to maintain a minimum sample density without requiring a new ray to be traced.

Once a sample is verified, or if it is new, we may shade it according to our rendering algorithm, and may store the results in the shading buffer, alongside its subpixel position.

Reconstruction

Each color sample stored in the previous step carries an RGB color and subpixel position. We may then filter our resulting color using a 3×3 truncated spatial Gaussian filter.

After reconstruction, an additional post processing step may be performed. When performing this additional step, we may calculate and store motion vectors in the shading cache, picking the one with maximum length during reconstruction.

Implementation Details

Our re-projection and analysis phases may be implemented as OpenGL compute shaders. The re-projection shader may transfer data between two identically deep screen sized buffers. The verification and shading step may be implemented on the GPU in the camera program using an NVIDIA OptiX ray tracing engine. The programmable ray tracing pipeline of OptiX may allow us to insert our cache management.

Progressive Path Tracing

Our screen space sample data structure may serve a double purpose: nearby samples in the data structure are close in world space, and the majority of samples are consistent in world space across frames. These properties may make stable ray tracing suitable for accumulating view-independent but time-dependent information, such as diffuse indirect illumination.

For example, we may apply our technique on top of standard unidirectional path tracing to cache diffuse indirect illumination in a dynamic scene. For performance reasons, our path tracing may have a fixed maximum trace depth. For each frame, we may choose a random direction, trace a new path in that direction, and accumulate the final result. Directions may be sampled using a cosine-weighted hemispherical distribution. For a completely static scene, we may give equal importance to all frames. Since we may want to be able to react to dynamic content in the scene, we may use a simple exponential moving average with integration factor 0.1. More complicated sampling schemes may be possible, such as accumulating indirect illumination to allow convergence when camera and scene are static.

Discussion

Stable ray tracing may improve temporal stability while retaining sharpness. Our algorithm may offer an intermediate solution between supersampling, which is sharp but temporally unstable, and temporal antialiasing, which is too blurry. The reason for this excessive blurriness may be the high temporal instability in the input from supersampling. Since we do not have this temporal instability, we can apply a more relaxed temporal filtering (larger a) and thus strike a compromise between stability and sharpness.

CONCLUSION

Interactive stable ray tracing represents a new practical technique for stable shading in interactive ray tracing. Our technique may be based on sample re-projection and may introduce low cost sample analysis for generating and evicting samples in the re-projection cache. The stable ray tracing may be useful for striking a balance between temporal stability and image sharpness in interactive ray tracing applications. If a rendering budget allows a target sample density of just 4 samples per pixel, our technique may eliminate most spatial aliasing artifacts and provide a visually pleasing (sharp, antialiased) and fairly temporally stable result. Since we have stable shading in a ray tracing context, we may use our shading cache to add global illumination effects such as progressively path traced indirect illumination. In general, our algorithm may ease the use of progressive techniques when a scene is dynamic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for implementing stable ray tracing during a rendering of a current frame, comprising:

identifying a plurality of old hit points used in a previously rendered frame;

re-projecting the plurality of old hit points within a current frame to create a plurality of samples within a screen space of the current frame;

adjusting the plurality of samples within the screen space of the current frame, based on one or more criteria, including removing one or more of the plurality of samples from a pixel within the screen space:

when the pixel and one or more neighboring pixels contain a total number of samples greater than a threshold;

determining a plurality of current hit points within the current frame by tracing, for each of the plurality of samples, a ray from the sample toward a corresponding old hit point for the sample to determine a current hit point corresponding to the sample for the current frame, where the current hit point may include the corresponding old hit point for the sample or an updated hit point for the sample;

shading at least a portion of the plurality of current hit points to obtain a color for each of the plurality of samples within the screen space of the current frame; and reconstructing a final color for a plurality of pixels in the screen space of the current frame, utilizing the color for each of the plurality of samples within the screen space of the current frame.

2. The method of claim 1, wherein the re-projecting includes computing, for each of the plurality of old hit points, a location of one of the plurality of samples within a screen space, where the location indicates an intersection at the screen space of a ray intersecting the old hit point.

3. The method of claim 1, wherein the screen space is represented by a screen space data structure, and, for one or more single pixels of the screen space data structure, two or more of the plurality of samples are stored within the single pixel.

4. The method of claim 1, wherein adjusting the plurality of samples within the screen space of the current frame includes adding one or more samples to a pixel within the screen space when the pixel contains a number of samples less than a threshold.

5. The method of claim 1, wherein adjusting the plurality of samples within the screen space of the current frame includes:

dividing each of the plurality of pixels within a screen space data structure into a plurality of subpixels;

computing a target range of samples for each of the plurality of pixels;

determining, for each of the plurality of pixels, a number of samples stored within that pixel; and comparing, for each of the plurality of pixels, the number of samples stored within the pixel to the target range of samples computed for the pixel.

6. The method of claim 5, further comprising, for each of the plurality of pixels:

upon determining that the pixel contains a number of samples greater than the target range of samples:

identifying a subpixel within the pixel that has a greatest number of samples when compared to all subpixels within the pixel, and discarding a random sample from the subpixel;

wherein the identifying and the discarding are performed until the pixel contains a number of samples within the target range of samples.

7. The method of claim 5, further comprising, for each of the plurality of pixels:

upon determining that the pixel contains a number of samples less than the target range of samples:

identifying a subpixel within the pixel that has a fewest number of samples when compared to all subpixels within the pixel, generating a sample, and adding the sample to the subpixel;

wherein the identifying, the generating, and the adding are performed until the pixel contains a number of samples within the target range of samples.

8. The method of claim 1, wherein shading the plurality of current hit points includes re-using one or more of previous shading computation values and previous shading results for one or more of the plurality of current hit points.

9. The method of claim 8, wherein the previous shading computation values include one or more of specular highlights and diffuse color.

10. The method of claim 1, wherein adjusting the plurality of samples within the screen space of the current frame includes:

determining that an old hit point is occluded in the current frame; and keeping the old hit point in a cache until it is occluded for a predetermined number of frames.

11. The method of claim 1, further comprising:

identifying one or more secondary rays;

determining whether each of the one or more secondary rays has a possible associated change in occlusion; and for each of the one or more secondary rays, tracing the secondary ray or reusing previous tracing results for the secondary ray, based at least in part on the determining.

12. The method of claim 1, wherein the final color for one or more of the plurality of pixels are determined utilizing a reconstruction filter that is larger than a single pixel.

13. The method of claim 1, further comprising, during the re-projecting, discarding one or more of the plurality of old hit points upon determining that one or more rays from one or more of the plurality of old hit points fall outside of a view of the screen space of the current frame.

14. A system for implementing stable ray tracing during a rendering of a current frame, comprising:

a processor that is configured to:

identify a plurality of old hit points used in a previously rendered frame;

re-project the plurality of old hit points within a current frame to create a plurality of samples within a screen space of the current frame;

adjust the plurality of samples within the screen space of the current frame, based on one or more criteria, including removing one or more of the plurality of samples from a pixel within the screen space:

when the pixel and one or more neighboring pixels contain a total number of samples greater than a threshold;

determine a plurality of current hit points within the current frame by tracing, for each of the plurality of samples, a ray from the sample toward a corresponding old hit point for the sample to determine a current hit point corresponding to the sample for the current frame, where the current hit point may include the corresponding old hit point for the sample or an updated hit point for the sample;

shade at least a portion of the plurality of current hit points to obtain a color for each of the plurality of samples within the screen space of the current frame; and reconstruct a final color for a plurality of pixels in the screen space of the current frame, utilizing the color for each of the plurality of samples within the screen space of the current frame.

15. The system of claim 14, wherein the re-projecting includes computing, for each of the plurality of old hit points, a location of one of the plurality of samples within a screen space, where the location indicates an intersection at the screen space of a ray intersecting the old hit point.

16. The system of claim 14, wherein the screen space is represented by a screen space data structure, and, for one or more single pixels of the screen space data structure, two or more of the plurality of samples are stored within the single pixel.

17. The system of claim 14, wherein adjusting the plurality of samples within the screen space of the current frame includes adding one or more samples to a pixel within the screen space when the pixel contains a number of samples less than a threshold.

18. A non-transitory computer-readable storage medium storing instructions that, when executed by a processor, causes the processor to perform steps for implementing stable ray tracing during a rendering of a current frame, comprising:

identifying a plurality of old hit points used in a previously rendered frame;

re-projecting the plurality of old hit points within a current frame to create a plurality of samples within a screen space of the current frame;

adjusting the plurality of samples within the screen space of the current frame, based on one or more criteria, including removing one or more of the plurality of samples from a pixel within the screen space:

when the pixel and one or more neighboring pixels contain a total number of samples greater than a threshold;

determining a plurality of current hit points within the current frame by tracing, for each of the plurality of samples, a ray from the sample toward a corresponding old hit point for the sample to determine a current hit point corresponding to the sample for the current frame, where the current hit point may include the corresponding old hit point for the sample or an updated hit point for the sample;

shading at least a portion of the plurality of current hit points to obtain a color for each of the plurality of samples within the screen space of the current frame; and reconstructing a final color for a plurality of pixels in the screen space of the current frame, utilizing the color for each of the plurality of samples within the screen space of the current frame.

* * * * *